(12) United States Patent
Tate, Jr.

(10) Patent No.: US 7,136,763 B2
(45) Date of Patent: Nov. 14, 2006

(54) INCREASING CURRENT AND VOLTAGE SENSOR ACCURACY AND RESOLUTION IN ELECTRIC AND HYBRID ELECTRIC VEHICLES

(75) Inventor: Edward D. Tate, Jr., Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 64 days.

(21) Appl. No.: 10/463,110

(22) Filed: Jun. 17, 2003

(65) Prior Publication Data

US 2004/0260491 A1  Dec. 23, 2004

(51) Int. Cl.
*G06F 19/00* (2006.01)
(52) U.S. Cl. ....................................... 702/64
(58) Field of Classification Search .................. 702/64, 702/35; 324/322, 772, 500, 76.11; 700/293, 700/291; 600/323; 340/538, 660; 177/25; 438/57, 1; 345/156; 607/2; 318/432, 701; 257/292; 348/308, 302; 280/461; 359/889; 356/418
See application file for complete search history.

(56) References Cited

U.S. PATENT DOCUMENTS

| | | | | |
|---|---|---|---|---|
| 6,344,670 | B1* | 2/2002 | Yamaguchi et al. | 257/292 |
| 6,400,158 | B1* | 6/2002 | Van Groningen et al. | 324/322 |
| 6,637,934 | B1* | 10/2003 | Henderson et al. | 374/178 |
| 2001/0052941 | A1* | 12/2001 | Matsunaga et al. | 348/308 |

* cited by examiner

*Primary Examiner*—John Barlow
*Assistant Examiner*—Tung S. Lau
(74) *Attorney, Agent, or Firm*—Christopher DeVries

(57) ABSTRACT

A method for estimating an electrical measurement, such as a current or a voltage, comprises generating an analog electrical measurement signal using a sensor. An analog filter filters the analog electrical measurement signal. An A/D converter samples the analog signal and generates a digital electrical measurement signal. A matrix is formed based on the characteristics of the analog filter. An estimated actual current or voltage is calculated based on a relationship between the digital signal and the matrix.

38 Claims, 4 Drawing Sheets

INCREASING CURRENT AND VOLTAGE SENSOR ACCURACY AND RESOLUTION IN ELECTRIC AND HYBRID ELECTRIC VEHICLES

FIELD OF THE INVENTION

The present invention relates to current and voltage sensors, and more particularly methods and apparatus for improving current and voltage sensor accuracy and resolution.

BACKGROUND OF THE INVENTION

Electric and hybrid vehicles include a propulsion system that typically includes an electric motor and/or an engine. Current for powering the electric motor is supplied by a battery subsystem. Key performance issues of the electric and hybrid vehicles include fuel efficiency, emissions, and drivability, which depend largely on the operation of the propulsion system.

The battery subsystem is a significant element of the propulsion system of these vehicles. An accurate state of charge (SOC) algorithm improves performance of the battery subsystem, and therefore the vehicle. The SOC algorithm requires an accurate current sensor for sensing current in the battery subsystem. The battery subsystem also requires an accurate analog-to-digital (A/D) converter that communicates with the current sensor. Other applications requiring accurate current sensing include fuel cell and supercapacitor systems.

Current sensor measurements are limited by current sensor accuracy and resolution, as well as A/D converter resolution. One conventional method for improving the accuracy of current sensor measurements uses multiple A/D converters and/or multiple current sensors. Using multiple converters and sensors increases the complexity and cost of the battery subsystem. Another conventional method uses an A/D converter having a higher resolution. However, there are limits to A/D converter resolution.

SUMMARY OF THE INVENTION

A method for estimating current or voltage in an electrical system comprises generating an analog current or voltage signal using a sensor. The signal is filtered using an analog filter. An A/D converter samples the analog signal and generates a digital signal. A matrix based on characteristics of the analog filter is formed. An estimated actual current or voltage is calculated based upon a relationship between the digital signal and the matrix.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
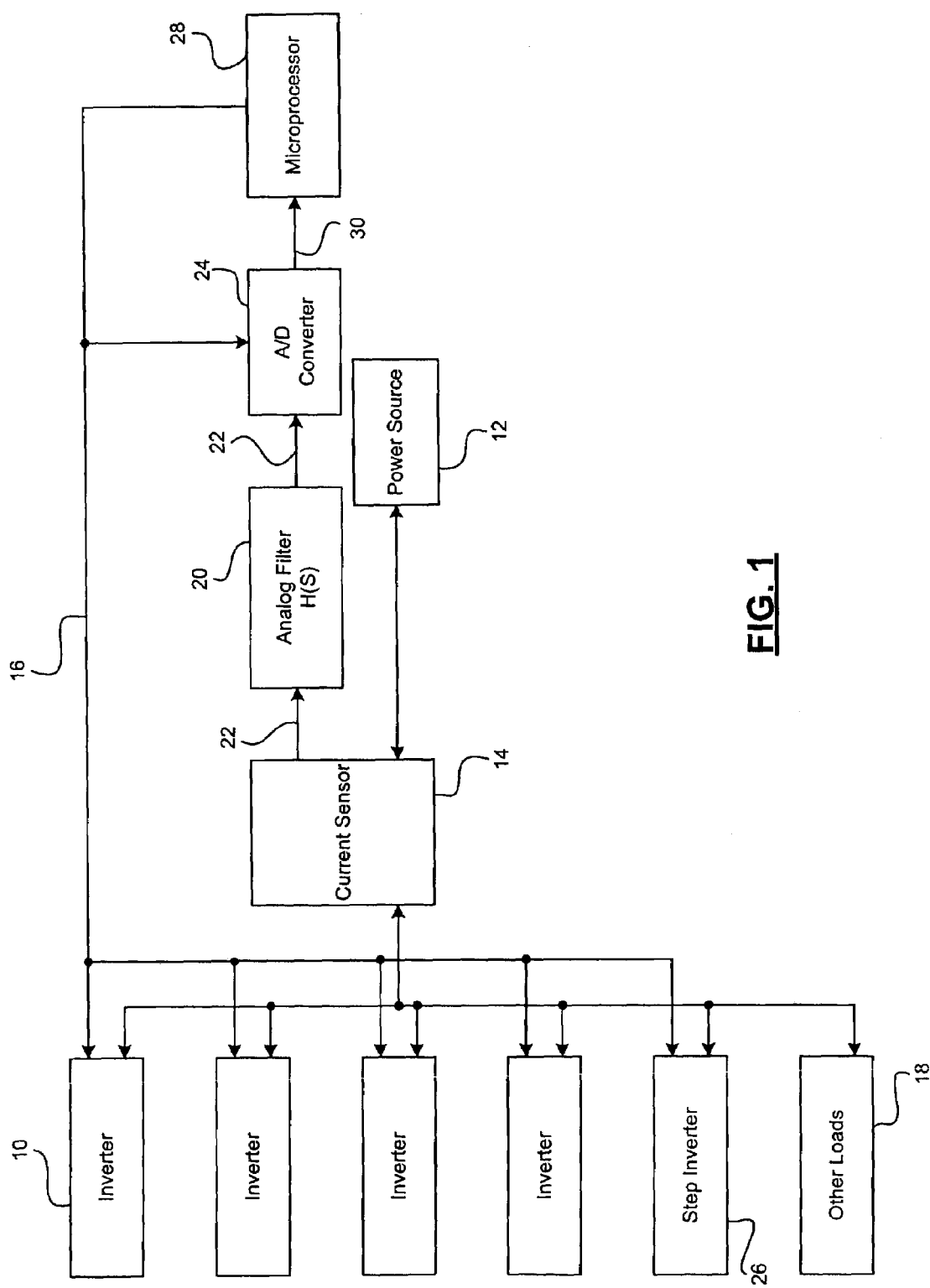
FIG. 1 is a functional block diagram of a current sensing system according to the present invention.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, one or more inverters 10 draw current from a power source 12. The power source 12 selectively receives power from the inverters 10. The inverters 10 draw current through a current sensor 14. The inverters 10 change power settings to vary the magnitude of current drawn from the power source 12 through the current sensor 14. A trigger 16 communicates with the inverters 10 to synchronize power setting changes. The trigger 16 may be a physical wire, a serial data message or other suitable trigger. The trigger 16 may be executed at periodic time intervals. Additional loads 18 may also receive power from the power source 12.

The current sensor 14 is implemented with current sense hardware such as hall effect sensors, sense resistors, or other appropriate hardware and/or software. An analog filter 20 receives an analog current signal 22 from the current sensor 14. In the exemplary embodiment, the analog filter 20 is a low-pass filter. However, other suitable filters may be used. An analog to digital (A/D) converter 24 converts the analog current signal 22 from the current sensor 14 into a digital current signal. The A/D converter 24 may communicate with the trigger 16 to sample the analog signal 22 in sync with inverter 10 power setting changes. Alternatively, a step inverter 26 may change power settings in a manner that causes the analog signal 22 to transition through discrete levels of the A/D converter 24.

A microprocessor 28 receives the digital current signal 30 from the A/D converter 24. The microprocessor 28 executes a current estimating algorithm to reconstruct the digital current signal 30. The current estimating algorithm results in a current estimate with a resolution that is greater than the resolution of the A/D converter 24. Additionally, the microprocessor 28 generates the trigger 16 to synchronize the sampling of the A/D converter 24 with power setting changes by the inverters 10.

Figure 2:
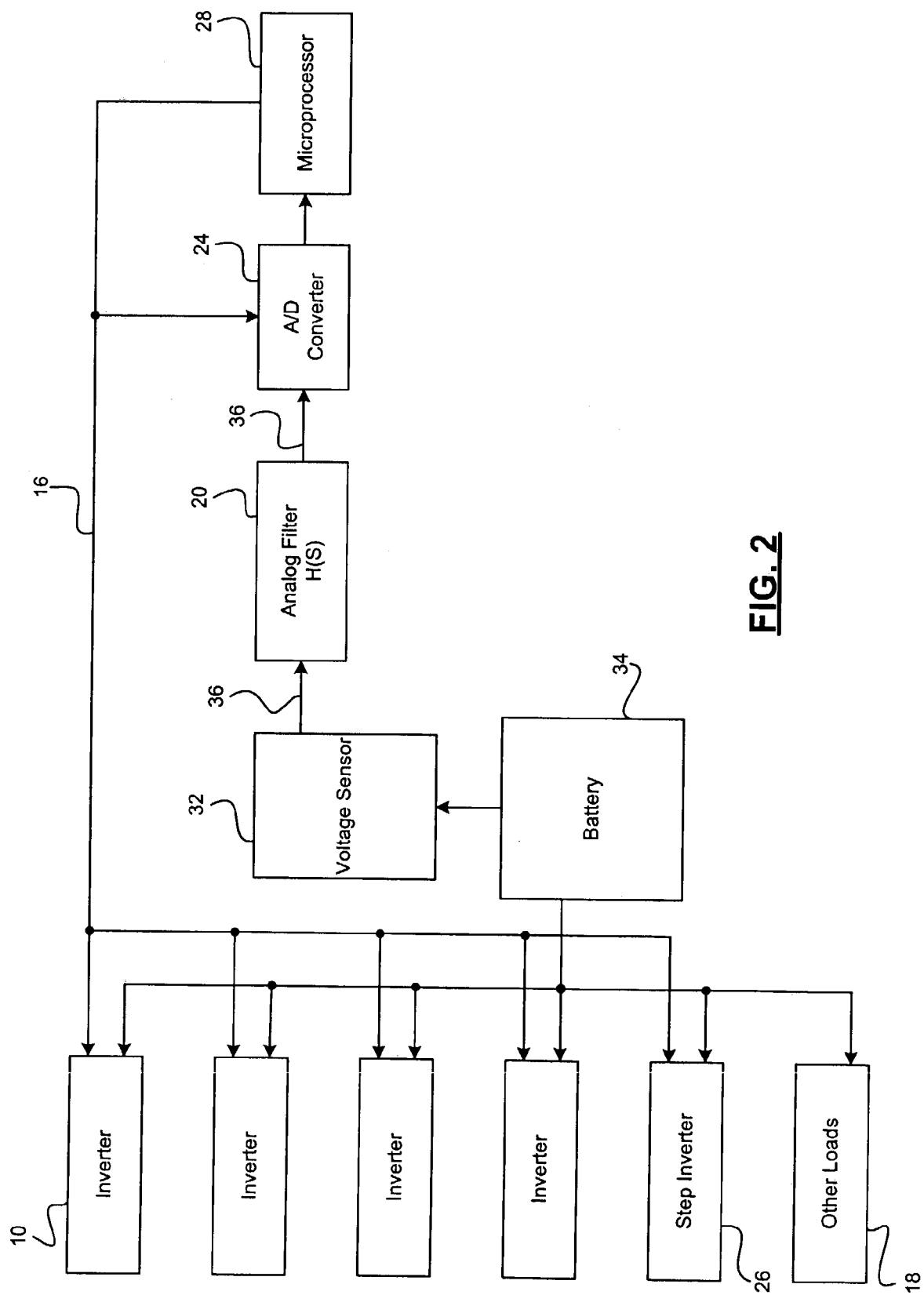
FIG. 2 is a functional block diagram of a voltage sensing system according to the present invention.

Referring now to FIG. 2, an alternative embodiment uses a voltage sensor 32. The inverters 10 draw power from a battery 34 having a known source impedance. The voltage sensor 32 measures the voltage of the battery 34. The A/D converter 24 converts an analog voltage signal 36 from the voltage sensor 32 into a digital voltage signal 38. The microprocessor 28 executes a voltage estimating algorithm to reconstruct the digital voltage signal 38.

Figure 3:
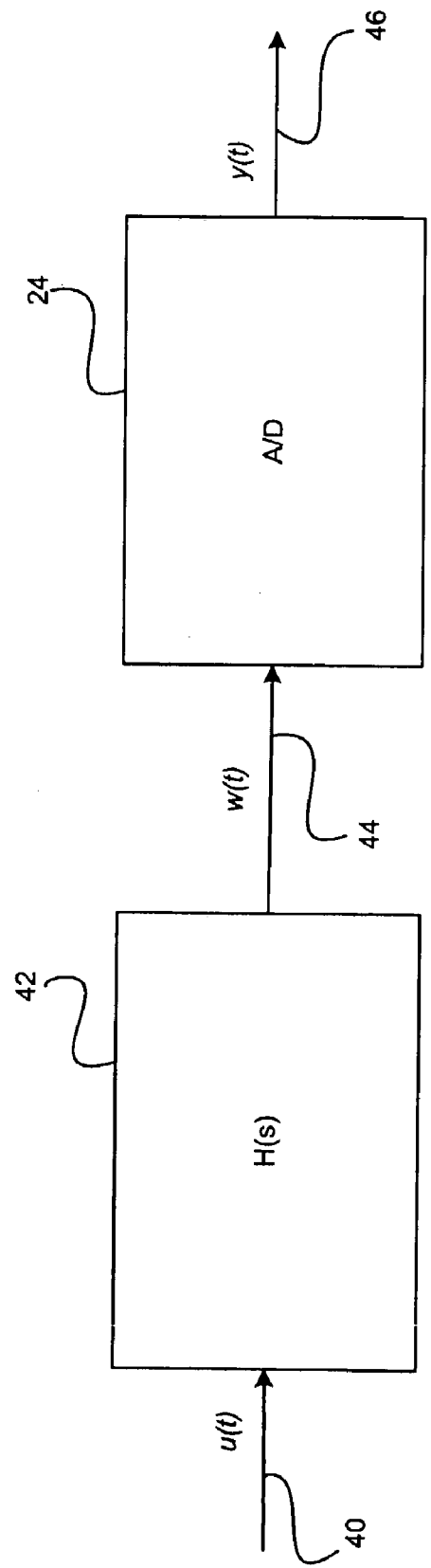
FIG. 3 is a signal flow model of the current sensing system according to the present invention.

Referring now to FIG. 3, u(t) is an input signal 40 to a signal flow model of the present invention. The input signal 40 is the sum of the currents (or voltages) from the inverters 10 and the other loads 18 in FIGS. 1 and 2. H(s) is a transfer function 42 of the analog filter 20 in FIGS. 1 and 2. The analog filter 20 filters the input signal 40 to produce w(t), which is a filtered analog input signal 44. The A/D converter 24 converts the filtered input signal 44 to a quantized input 46 y(t).

Referring to FIGS. 1 through 3, the trigger 16 may synchronize the inverters 10 to change power settings at first rate such as 20 Hz and to sample the quantized input 46 at a second rate such a 200 Hz. The second rate is preferably higher than the first rate. As a result, the quantized input 46 is sampled multiple times for each power setting of the inverters 10.

In steady-state (constant current) conditions with no noise, the accuracy of the quantized input 46 is not impaired. However, variable current and noise levels affect the accuracy of the A/D converter 24 (as shown in FIGS. 1, 2, and 3). Although the input signal 40 may be constant, noise may cause the quantized input 46 to fluctuate between discrete A/D converter levels. Therefore, the quantized input 46 may not represent actual current measurements. However, actual current measurements may be estimated if characteristics of the analog filter 20 are known. Any change in the input signal 40 can be determined by comparing the quantized input 46 to a known response of the analog filter 20. By observing the quantized input 46, the microprocessor 28, may estimate values of the input signal 40 that would result in the quantized input 46. The microprocessor 28 may estimate values that are not constrained by quantization levels of the A/D converter 24.

Figure 4:
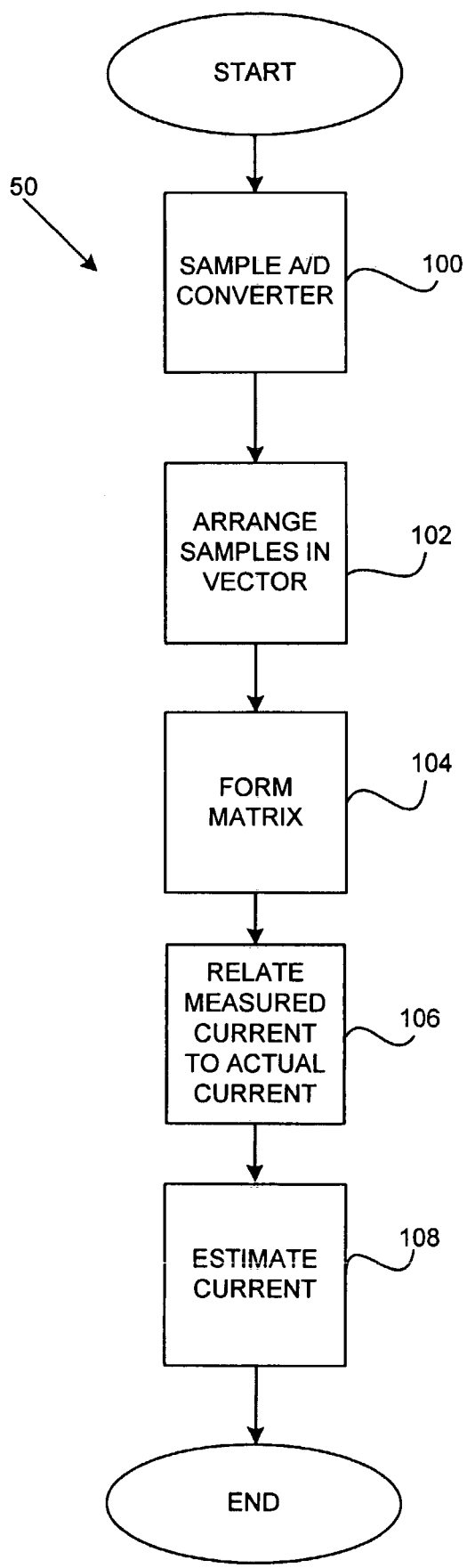
FIG. 4 is a functional block diagram of a current estimating algorithm according to the present invention.

Referring now to FIG. 4, a current estimating algorithm 50 is executed to correspond with changes in inverter power settings. The current estimating algorithm 50 improves accuracy and resolution of the quantized input 46 in FIG. 3. The current estimating algorithm 50 may be executed at any rate up to the sampling rate of the A/D converter 24 (as shown in FIGS. 1, 2 and 3). The microprocessor 28 (as shown in FIGS. 1 and 2) collects current samples from the A/D converter 24 in step 100. The microprocessor 28 arranges the samples into a column vector Y of measured currents in step 102. The column vector Y consists of n samples from $Y_1$ to $Y_m$. $Y_1$ and $Y_m$ are the oldest sample and most recent sample, respectively, taken by the microprocessor 28.

The microprocessor 28 forms a matrix A with m rows and n columns in step 104. The matrix A is formed based upon characteristics of the analog filter 20 of FIGS. 1 and 2. Relevant characteristics of the analog filter 20 include linearity, saturation and damping characteristics, and a time constant. The analog filter 20 is preferably linear. The analog filter 20 may be nonlinear if adjustments are made to the current estimating algorithm 50.

An impulse response of the analog filter 20 is h(t). For t<0, h(t) is 0. The matrix A is formed as follows:

$$A_{ij} = \int_{\tau=(j-1)T_c}^{j \cdot T_c} h(T_s \cdot i - \tau) \cdot d\tau$$

wherein $T_S$ is the sampling rate of the quantized input 46 of the A/D converter 24 and $T_C$ is the current (most recent) A/D converter sample. In step 106, the microprocessor 28 uses the column vector Y and the matrix A to derive a vector U of actual currents. A relationship between measured currents Y, matrix A, and actual currents U is expressed as:

$$Y = A \cdot U + V$$

wherein vector V represents quantization noise and noise due to other loads. V is not know in advance and must be estimated through statistics and probability. Noise can be described by a probability density function (a histogram of noise values over a very long period of time) and an autocorrelation function (the extent that noise values are related to previous noise values).

The microprocessor 28 calculates an estimate of an actual current estimate u using the above relationship in step 108. In the preferred embodiment, the microprocessor 28 uses a least squares method to calculate the current estimate u. The microprocessor estimates a current u based on a history of current measurements Y. The least squares method calculates the estimated current vector Û as follows:

$$\hat{U} = (A^T A)^{-1} A^T \cdot Y$$

Matrix A is known and constant. Therefore, $(A^T A)^{-1} A^T$ can be pre-calculated by the microprocessor 28, resulting in:

$$\hat{U} = \overline{A} \cdot Y$$

Additionally, this calculation may be further reduced to calculate a single current estimate u:

$$\hat{u} = \overline{A}_m \cdot Y$$

wherein $\overline{A}_m$ is the last row in $\overline{A} = (A^T A)^{-1} A^T$. The result of this simplification is that the current estimate may be reduced to a finite impulse response (FIR) filter. The FIR filter is executed in sync with changes in inverter power settings. Although the least squares method is described, other methods are possible. Alternatively, a convex optimization function may be used to estimate the current u.

Accuracy of the current estimate may be affected by the number of power setting changes and the delay between a power setting change and the execution of the current estimate. Additionally, accuracy of the current estimating algorithm 50 may be affected by knowledge of the characteristics of the analog filter 20. However, knowledge of filter characteristics are limited by manufacturing and temperature variations. The characteristics may be derived by injecting a known signal into the analog filter 20 and estimating the necessary characteristics.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A method for estimating current in an electrical system, comprising:
    generating an analog current signal using a current sensor;
    filtering the analog current signal using an analog filter;
    generating a digital current signal by sampling the analog current signal using an A/D converter;
    forming a two dimensional matrix based on an impulse response of the analog filter and predetermined characteristics of the analog filter, the predetermined characteristics comprising at least one of linearity, saturation, and damping;
    defining a relationship between the digital current signal and the two dimensional matrix; and
    calculating and storing an estimated actual current based on the relationship;
    wherein the current sensor is one of a Hall effect sensor and at least one sense resistor.

2. The method according to claim 1 further comprising:
    drawing current through the current sensor using an inverter; and varying the current drawn through the current sensor using the inverter, wherein the inverter varies the current drawn in sync with a trigger.

3. The method according to claim 2 wherein the inverter communicates with a power source.

4. The method according to claim 2 further comprising communicating the trigger to the inverter at predetermined intervals.

5. The method according to claim 1 wherein the analog filter is a low-pass filter.

6. The method according to claim 1 wherein the current sensor communicates with at least one of a fuel cell system and a supercapacitor system.

7. A method for estimating current in an electrical system, comprising:
   generating an analog current signal using a current sensor;
   filtering the analog current signal using an analog filter;
   generating a digital current signal by sampling the analog current signal using an A/D converter;
   forming a two dimensional matrix based on an impulse response of the analog filter and predetermined characteristics of the analog filter, the predetermined characteristics comprising at least one of linearity, saturation, and damping;
   defining a relationship between the digital current signal and the two dimensional matrix; and
   calculating and storing an estimated actual current based on the relationship;
   wherein the current sensor communicates with at least one of a fuel cell system and a supercapacitor system.

8. The method according to claim 7 further comprising:
   drawing current through the current sensor using an inverter; and
   varying the current drawn through the current sensor using the inverter, wherein the inverter varies the current drawn in sync with a trigger.

9. The method according to claim 8 wherein the inverter communicates with a power source.

10. The method according to claim 8 further comprising communicating the trigger to the inverter at predetermined intervals.

11. The method according to claim 7 wherein the current sensor is one of a Hall effect sensor and at least one sense resistor.

12. The method according to claim 7 wherein the analog filter is a low-pass filter.

13. A method for estimating voltage in an electrical system, comprising:
   generating an analog voltage signal using a voltage sensor;
   filtering the analog voltage signal using an analog filter;
   generating a digital voltage signal by sampling the analog voltage signal using an A/D converter;
   forming a two dimensional matrix based on an impulse response of the analog filter and predetermined characteristics of the analog filter, the predetermined characteristics comprising at least one of linearity, saturation, and damping;
   defining a relationship between the digital voltage signal and the two dimensional matrix; and calculating and storing an estimated actual voltage based on the relationship;
   wherein the voltage sensor communicates with at least one of a fuel cell system and a supercapacitor system.

14. The method according to claim 13 wherein generating an analog voltage signal includes generating a voltage measurement of a power source.

15. The method according to claim 14 wherein the power source is a battery.

16. The method according to claim 14 further comprising:
   drawing power from power source with an inverter; and
   varying the power drawn from the power source, wherein the inverter varies the power drawn synchronous to a trigger.

17. The method according to claim 16 wherein the A/D converter samples the analog voltage signal synchronous to a trigger.

18. The method according to claim 16 further comprising communicating the trigger to the inverter at predetermined intervals.

19. The method according to claim 13 wherein the analog filter is a low-pass filter.

20. A method for estimating an electrical measurement with a measurement algorithm comprising:
   collecting measurement samples in a column vector;
   forming a two dimensional matrix based on an impulse response of an analog filter and predetermined characteristics of the analog filter, the predetermined characteristics comprising at least one of linearity, saturation, and damping;
   defining a relationship between the vector and the two dimensional matrix; and estimating and storing an electrical measurement based on the relationship;
   wherein estimating and storing the electrical measurement includes deriving the electrical measurement from the relationship using a least squares method.

21. The method according to claim 20 wherein forming the two dimensional matrix includes forming the two dimensional matrix according to a sampling rate of measurement samples, and a measurement sample.

22. The method according to claim 20 wherein defining the relationship includes forming the relationship according to the two dimensional matrix, a vector of electrical measurements, and noise, wherein the column vector is equal to the product of the two dimensional matrix and the vector of electrical measurements, adjusted by the noise.

23. The method according to claim 20 wherein the electrical measurement is a current.

24. The method according to claim 20 wherein the electrical measurement is a voltage.

25. The method according to claim 20 wherein collecting the measurement samples includes collecting the measurement samples from an A/D converter.

26. The method according to claim 20 further comprising changing a power setting at an inverter.

27. The method according to claim 26 wherein estimating the electrical measurement includes estimating the electrical measurement synchronous to changing the power setting.

28. An electrical measurement system comprising:
   an electrical sensor that generates a first set of electrical measurements;
   an analog filter that filters the first set of electrical measurements;
   an A/D converter that generates electrical samples from the first set of electrical measurements;
   a microprocessor that forms a two dimensional matrix based on an impulse response of the analog filter and predetermined characteristics of the analog filter, defines a relationship between the electrical samples and the two dimensional matrix, and calculates a second set of electrical measurements based on the relationship, wherein the predetermined characteristics comprise at least one of linearity, saturation, and damping:

a power source; and an inverter that draws power from the power source.

wherein the power source is one of a battery, a fuel cell system, and a supercapacitor system.

29. The electrical measurement system according to claim 28 wherein the electrical sensor is a current sensor.

30. The electrical measurement system according to claim 28 wherein the electrical sensor is a voltage sensor.

31. The electrical measurement system according to claim 28 wherein the inverter varies the power drawn from the power source.

32. The electrical measurement system according to claim 31 wherein the inverter varies the power drawn synchronous to a trigger.

33. The electrical measurement system according to claim 32 wherein the A/D converter generates the electrical samples synchronous to the trigger.

34. The electrical measurement system according to claim 32 wherein the trigger executes periodically.

35. The electrical measurement system according to claim 28 wherein the filter is a low-pass filter.

36. The electrical measurement system according to claim 28 wherein the electrical sensor is a current sensor that is one of a hall effect sensor and at least one sense resistor.

37. An electrical measurement system comprising:

an electrical sensor that generates a first set of electrical measurements;

an analog filter that filters the first set of electrical measurements;

an A/D converter that generates electrical samples from the first set of electrical measurements;

a microprocessor that forms a two dimensional matrix based on an impulse response of the analog filter and predetermined characteristics of the analog filter, defines a relationship between the electrical samples and the two dimensional matrix, and calculates a second set of electrical measurements based on the relationship, wherein the predetermined characteristics comprise at least one of linearity, saturation, and damping;

wherein the electrical sensor is a current sensor that is one of a hall effect sensor and at least one sense resistor.

38. The electrical measurement system according to claim 37 wherein the filter is a low-pass filter.

* * * * *